United States Patent Office 3,420,752
Patented Jan. 7, 1969

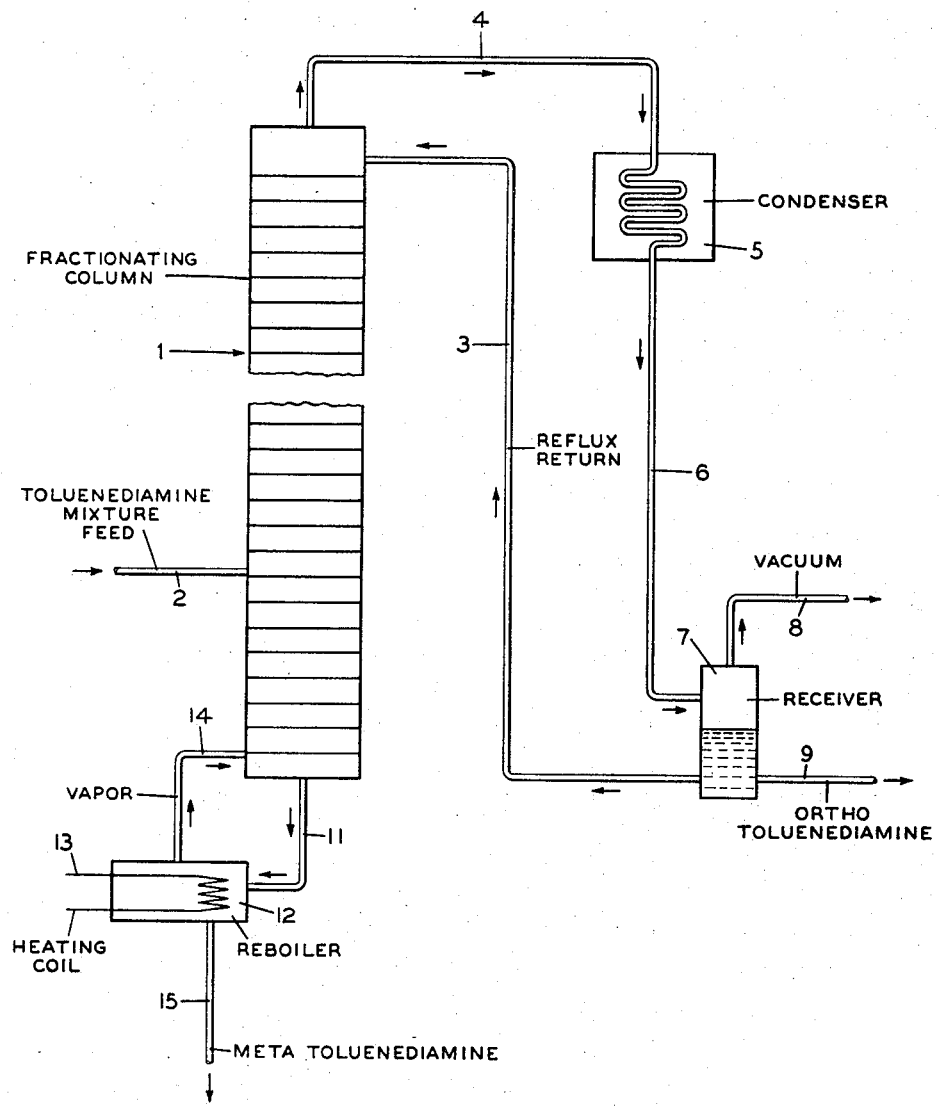

3,420,752
PURIFICATION OF TOLUENEDIAMINE MIXTURES BY VACUUM DISTILLATION
Voldemar Kirss and Jong C. Park, Buffalo, N.Y., assignors to Allied Chemical Corporation, New York, N.Y., a corporation of New York
Filed May 17, 1965, Ser. No. 456,215
U.S. Cl. 203—94     3 Claims
Int. Cl. B01d 3/00; C07c 85/16

ABSTRACT OF THE DISCLOSURE

Process for the rectification of crude toluenediamine mixtures consisting of meta toluenediamines and minor amounts of ortho toluenediamines, said toluenediamine mixtures being obtained by reduction of the dinitration product of toluene, comprising introducing said crude mixture of toluenediamines into a distillation column, maintaining the column under subatmospheric pressure of not more than about 110–120 mm. Hg absolute at the top of said column, removing as distillate a minor fraction containing predominantly ortho toluenediamines, cooling and condensing said overhead vapor, returning a portion of said condensate to the top of the column to maintain a reflux ratio of at least about 15 to 1, heating the unvaporized feed passing down through the bottom of the column to effect stripping of the more volatile constituents contained therein, and recovering, as bottoms product, a mixture of meta toluenediamines containing less than 0.5% by weight of ortho toluenediamines.

---

This invention relates to the separation of toluenediamine mixtures and in particular to the separation of toluenediamine mixtures useful in the preparation of tolylene diisocyanates and obtained by reduction of the dinitration product of toluene.

In the commercial manufacture of tolylene diisocyanates, toluenediamine mixtures consisting predominantly of 2,4- and 2,6-toluenediamines hereafter referred to as meta toluenediamines and minor, though significant, amounts generally up to about 3 to 4% by weight, of 2,3- and 3,4-toluenediamines hereafter referred to as ortho toluenediamines together with traces of 2,5-toluenediamine generally about 0.2% and obtained by dinitration of toluene and reduction of the resulting dinitration products are phosgenated continuously or otherwise, under conditions such that essentially complete reaction of the toluenediamines occurs. Phosgenation of the meta toluenediamine components of toluenediamine mixtures yields meta tolylene diisocyanates of value in the manufacture of urethane polymer. However, phosgenation of the ortho toluenediamine components of toluenediamine mixtures does not yield the corresponding ortho tolylene diisocyanates, but instead, gives rise to methylbenzimidazolones which contain two amino groups and which in their tautomeric 2-hydroxy-methylbenzimidazole forms contain both an amino and a hydroxyl group thereby providing in either form two active hydrogen sites capable of reacting with isocyanate residues, as depicted in the following series of reactions.

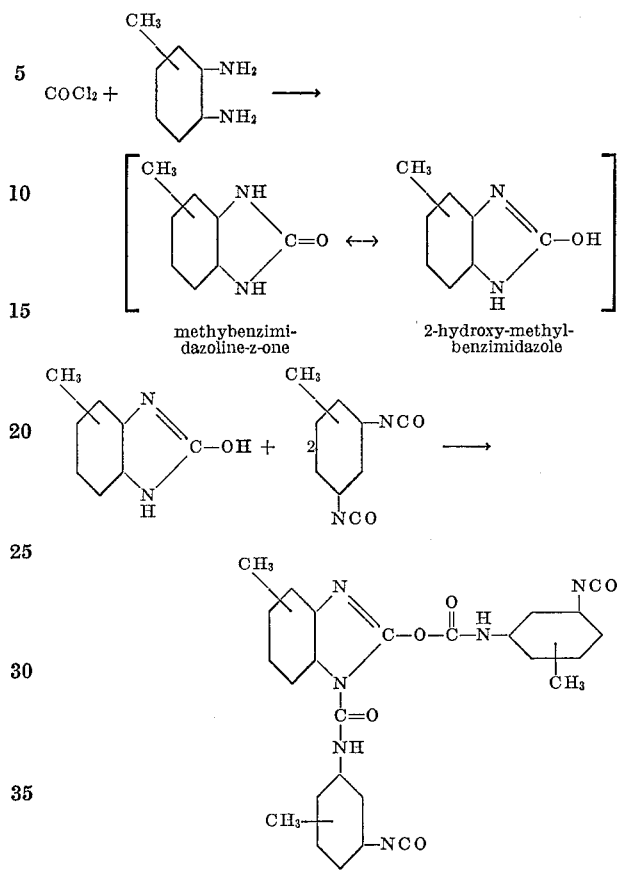

The equations shown above clearly indicate that in the phosgenation of toluenediamine mixtures containing both ortho and meta toluenediamines, the phosgenation products of the ortho toluenediamine components of the mixtures are not only devoid of useful isocyanate groups but, in addition, they actually consume at least an equivalent amount of diisocyanates present in the phosgenation mass and give rise to complex residues which can in turn consume additional amounts of the useful isocyanato groups. Consequently in the commercial preparation of isocyanates by the phosgenation of toluenediamine mixtures, significant quantities of complex products are formed in the phosgenation masses due to the presence of ortho toluenediamine impurities. Isocyanate compositions containing these complex residues are generally undesirable for the preparation of urethane polymers due to the poor reactivity of these complex aggregates in the polymerization reaction which results in the formation of urethane polymers having undesirable characteristics and a poor performance. The presence of these ortho toluenediamine phosgenation residues is particularly undesirable in polyisocyanate compositions derived from tolylene diamines and intended for the manufacture of rigid so-called "one-shot" urethane foams due to their slow reacting rates and due to their gradual precipitation from such compositions on storage, in the form of undesirable sediments, thereby requiring additional chemical or physical treatment of these compositions prior to actual use. It is therefore desirable, in the manufacture of tolylene diisocyanates to reduce materially in toluenediamine mixtures, any ortho toluenediamines present, prior to carrying out the phosgenation process. Unfortunately, ortho and meta toluenediamine mixtures so resemble each other chemically and physically that a satisfactory process for their separation has not yet been evolved. Certain chemical processes, in which the ortho toluenediamines are converted to cyclic complexes by reaction with carbon disulfide or with acid anhydrides from which the meta toluenediamines are separated, and crystallization processes, for example in which the ortho-diamines are removed in the mother liquor are known in the art. The chemical processes are undesirable in that they involve in addition to the actual chemical process, several other time-consuming and cost-increasing steps associated with chemical processes such as washing, drying and recrystallization or distillation of the purified meta toluenediamines. Crystallization processes are similarly time-consuming and require the agency of large amounts of solvents which have to be continuously refined for re-use. In addition, in both chemical and crystallization processes, the loss of more than negligible amounts of the desired product is unavoidable due to the similarity in the physical and chemical properties of ortho and meta toluenediamines. Thus a practical commercial method for the separation of ortho toluenediamines from meta toluenediamine mixtures is highly desirable.

It has now been discovered that difficulties attendant with the use of the prior art processes for removal of ortho toluenediamines from toluenediamine mixtures can be obviated by a process which comprises introducing a mixture of ortho and meta-toluenediamines obtained by reduction of the dinitration product of toluene in which the ortho toluenediamine constitutes a minor proportion generally about 1–5%, into a column still having at least 23 theoretical plates preferably about 29–50 plates, preferably introducing said toluenediamine feed at an intermediate point in the lower half of the column, maintaining the column under subatmospheric pressure of not more than about 110–120 mm. Hg absolute at the top of the column, preferably about 10 to 70 mm. Hg absolute, removing as distillate from the top of the column a minor fraction containing predominantly ortho toluenediamines, said overhead fraction generally containing more than 80% by weight ortho toluenediamine, cooling and condensing said overhead vapor, returning a portion of said condensate to the top of the column to maintain a reflux ratio of at least 15 to 1, preferably a reflux ratio of 25 to 40, the remaining portion of the condensate constituting a minor amount of the feed of the order of about 2–8% by weight of the feed, heating the unvaporized feed passing down through the bottom of the column to effect stripping of the more volatile constituents contained therein and recovering as distilland a mixture of meta toluenediamines containing less than 0.5% by weight of ortho toluenediamines.

The process of the present invention is especially useful for removing ortho diamine impurities from toluenediamine mixtures obtained by reduction of the products of the dinitration of toluene. The purified toluenediamine mixtures of this invention consist essentially of 2,4- and 2,6-toluenediamines, useful in the manufacture of 2,4- and 2,6-tolylene diisocyanate mixtures which are especially suited for the manufacture of urethane polymers. According to the process of this invention, a crude toluenediamine mixture containing about 1.5 to 3.5 percent or more by weight of ortho toluenediamines is submitted to an operation whereby preferably substantially all but at least a major portion of the ortho toluenediamines present in the diamine mixture are removed in the form of a forecut amounting generally to about 1.5 to 5.5 percent or more by weight of the total toluenediamine charge. The process of the present invention must be conducted at subatmospheric pressure, for example at an applied pressure of about 20–70 mm. Hg. In order to remove substantially all of the ortho diamines from the diamine mixture the operation of the present invention may be conducted using an efficient fractionating column having at least 23 theoretical plates and preferably 29 theroetical plates or more and using a reflux ratio at the top of the column of about 15 to 50 and preferably about 30. Authough not preferred the operation of this invention may be conducted batchwise in a batch distillation apparatus provided that such apparatus has the specified number of theoretical plates mentioned above and can be operated under a pressure of 10 to 70 mm. and a reflux ratio of at least 15 when less than 0.5% of ortho toluene diamines is desired in the rectified toluenediamine mixture. The operation of this invention can also be conducted in a continuous manner in a continuous distillation apparatus proivded that such apparatus is operated under the previously prescribed pressure, reflux ratio and number of theoretical plates.

The process of the present invention provides an efficient and economical method for removing ortho toluenediamine containants from toluenediamine mixtures. The attendant loss of useful meta toluenediamine constituents of the mixture is generally less than 0.5% by weight, depending upon the efficiency of the operation.

The process of the present invention provides a simple and efficient method for obtaining meta toluenediamine mixtures, essentially free of ortho toluenediamine impurities, which can be converted in excellent yields to useful tolylene diisocyanates without the attendant production of the above-mentioned high boiling complex residues.

In employing the process of the present invention in the manufacture of tolylene diisocyanates, a mixture of toluenediamines consisting essentially of about 96% of 2,4- and 2,6-toluenediamines, about 3–4% of 2,3- and 3,4-toluenediamines and generally about 0.2% of 2,5-toluenediamine is distilled in a fractionating column having at least 23 theoretical plates at a reflux ratio of about 15 to 50 until a distillate fraction corresponding to about 1.5 to 3.5 percent by weight of the diamine charge is collected. It is found, by gas chromatographic analysis of a portion of the collected distillate fraction and a portion of the residue, that the collected distillate fraction contains about 80–90 percent by weight of the total 2,3- and 3,4-toluenediamines present in the original diamine mixture and that the residue which corresponds to about 96.5 to 98.5 percent by weight of the total charge contains less than 0.5 percent by weight of ortho toluenediamines. This residue, now containing a reduced amount of ortho toluenediamines may be phosgenated according to well-known phosgenation methods to convert the metal toluenediamines to tolylene diisocyanates. The crude phosgenation product may then be degassed to remove by-product hydrogen chloride and excess phosgene and the degassed phosgenation product may be submitted to distillation to recover a distillate consisting essentially of a mixture of 2,4- and 2,6-tolylene diisocyanates in high yields, generally in excess of 95 percent, based on the metal toluenediamine content of the amine mixture.

In the accompanying drawing, there is shown diagrammatically and merely for the sake of illustration an apparatus which can be used for carrying out the process of this invention.

In the drawing there is shown a column 1 broken to indicate that the number of plates used may be larger than the number illustrated.

The toluenediamine feed mixture is delivered through inlet 2 and enters the column at a point intermediate the bottom and center of the column e.g. between the 12th and 13th plates from the bottom. As the feed mixture, preferably preheated to a temperature of about 100–200°

C. enters column 1 it comes in contact with hot vapors rising upwardly through the column with the result that the more volatile constituents of the toluenediamine mixture are vaporized and passed upwardly through the plates, preferably of the bubble cap type. Into the top of fractionating column 1 is introduced reflux through line 3 in an amount to provide a reflux ratio of at least 15:1 preferably about 25 to 35 to 1. Vapors released from the top of fractionating column 1 through line 4 contain predominantly ortho toluenediamines generally in an amount of from about 80–90% by weight of the vapors. Vapors pass through condenser 5 wherein the vapors are cooled and liquefied by indirect heat exchange with cooling water and the liquid condensate discharges through line 6 into receiver 7. Vacuum is maintained in the system through line 8. Liquid condensate collecting in the receiver 7 is returned to the top of column 1 in amount sufficient to provide a reflux ratio of at least 15:1. The remaining portion of condensate in receiver 7 and constituting predominantly ortho toluenediamines is discharged from the system through line 9. The pressure maintained at the top of the fractionating column must be below about 110–120 mm. Hg absolute preferably of the order of about 20–70 mm. Hg absolute. The temperature at the top depending on the pressure will vary fro mabout 150 to about 180° C. Due to pressure drop the pressure at the bottom of the column will be higher usually about 20–30 mm. Hg higher than at the top of the column. Similarly the temperature at the bottom of the column is about 20 to 50° higher than the temperature at the top of the column. The temperature in the column at the point of feed introduction is about 10 to 20° lower than the temperature at the bottom of the column. Liquid collecting in the bottom of fractionating column 1 passes down through line 11 into reboiler 12 wherein the liquid is heated by means of heating coil 13 for the purpose of vaporizing the more volatile constituents of the residue from the bottom of the column and to provide the necessary heat for effective rectification in the column. The vapors from the reboiler are returned to the bottom of the column via line 14. The product of the process consisting essentially of meta toluenediamines containing less than 0.5% by weight of ortho toluenediamine is discharged through line 15. Another important feature for optimum operation is avoidance of high temperatures in excess of 230° C. and long residence time in excess of 30 minutes of the liquid meta toluenediamine in the reboiler section. Temperatures and residence times substantially in excess of those stated above cause degradation and result in an inferior product.

In the examples below a fractionating column was used having 42 trays of which 30 were employed as rectifying and 12 as stripping, a reboiler, a condenser for cooling the overhead vapor and for maintaining a high reflux ratio, similar to that illustrated in the drawing. The column operating conditions were such that an efficiency of about 26 to about 32 theoretical plates was maintained.

Example 1

The feed was a mixture of toluenediamines having the following composition: meta toluenediamine 97.376%; ortho toluenediamine 2.34%; para toluenediamine .20%; and volatile constituents designated as Lites 0.084%. This feed was subjected to continuous rectification by introuction at a point between the 12th and 13th tray. The operating conditions are tabulated below:

| | |
|---|---|
| Reflux ratio | 30:1 |
| Head press., mm. Hg | 70 |
| Pressure drop, mm. Hg | 41 |
| Head temp., ° C. | 182 |
| Feed plate temp., ° C. | 212–213 |
| Reboiler temp., ° C. | 220–221 |
| Residence time, min. | 15 |
| Amount of O/H percent of feed | 2.28 |
| MTD loss, percent of feed | .164 |

There was removed from the top of the column as overhead 2.28% of the feed which had the following composition; 89.1% ortho toluenediamines; 7.2% meta toluenediamines and 3.7% Lites. The desired product removed as bottoms contained 99.479% meta toluenediamines; 0.316% ortho toluenediamines and 0.205% para toluenediamines.

Example 2

In another operation similar to Example 1 the reflux ratio was lowered to 25 to 1. The operating conditions were as follows:

| | |
|---|---|
| Reflux ratio | 25:1 |
| Head press., mm. Hg | 70 |
| Pressure drop, mm. Hg | 43 |
| Head temp., ° C. | 181 |
| Feed plate temp., ° C. | 212–213 |
| Reboiler temp., ° C. | 220–221 |
| Residence time, min. | 15 |
| Amount of O/H percent of feed | 1.52 |
| MTD loss, percent of feed | .0425 |

The overhead contained 90.6% ortho toluenediamines; 2.8% meta toluenediamines; and 6.6% Lites. The desired product removed as bottoms contained 99.33% meta toluenediamine; 0.47% ortho toluenediamine; and 0.20% para toluenediamines.

Example 3

The feed toluenediamines had the following composition: meta toluenediamine 96.88%; ortho toluenediamine 2.78%; para toluenediamine 0.19% and Lites 0.15%. This composition was subjected to continuous rectification in the 42 tray column under the following conditions:

| | |
|---|---|
| Head pressure, mm. Hg | 22:1 |
| Head pressure, mm. Hg | 60–61 |
| Pressure drop, mm. Hg | 44–45 |
| Head temp., ° C. | 182.5–182.6 |
| Feed plate temp. ° C. | 212.0 |
| Reboiler temp., ° C. | 220 |
| Residence time in reboiler, min. | 15 |
| Amount of O/H percent of feed | 3.9 |
| MTD loss, percent of feed | .47 |

There was removed from the top of the column as overhead 3.9% of the feed which had the following composition: 81.90% ortho toluenediamine; 12.08% meta toluenediamine and 6.02% Lites. The bottoms contained 99.502% meta toluene-diamine; 0.30% ortho toluenediamine; and 0.198% para toluenediamine.

Example 4

In another operation similar to Example 3 the reflux ratio was dropped to 15 to 1. The conditions of operation were as follows:

| | |
|---|---|
| Reflux ratio | 15:1 |
| Head pressure, mm. Hg | 60–61 |
| Pressure drop, mm. Hg | 44–45 |
| Head temp., °C. | 186.5–187.0 |
| Feed plate temp., ° C. | 212.5 |
| Reboiler temp., ° C. | 220 |
| Residence time in reboiler, min. | 15 |
| Amount of O/H percent of feed | 5.88 |
| MTD loss, percent of feed | 1.49 |

There was removed from the top of the column as overhead 5.88% of the feed which had the following composition: 68.15% ortho toluenediamine; 25.27% meta toluenediamine; and 6.57% Lites. The bottoms removed as product contained 99.25% meta toluenediamine; 0.40% ortho toluenediamine and 0.35% paratoluenediamine.

Example 5

This operation was conducted in a manner similar to the example above except that the column had 37 trays of which 25 trays were rectifying section and 12 trays were stripping section. The composition of the feed was meta toluenediamine 96.46%; ortho toluenediamine 1.94%; para toluenediamine 0.2%; Lites 0.3% and high boiling constituents termed Higher Boiler 1.1%. The conditions of operation are tabulated below:

| | |
|---|---|
| Reflux ratio | 30:1 |
| Head press., mm. Hg | 71 |
| Pressure drop, mm. Hg | 38 |
| Head temp., °C. | 185 |
| Feed plate temp., °C. | 213.0 |
| Reboiler temp., °C. | 220–220.5 |
| Residence time, min. | 15 |
| Amount of O/H percent of feed | 3.52 |

3.52% based on the feed was removed as overhead and had the following composition: 84.8% ortho toluenediamine; 7.86% meta toluenediamine; 7.18% Lites and 0.16% High Boiler. The product removed as bottoms contained 97.78% meta toluenediamine; 1.97% High Boiler; and 0.25% ortho toluenediamine.

Example 6

This operation was carried out in a manner similar to Example 5 except the reflux ratio was lowered to 20 to 1. The operating conditions are shown below:

| | |
|---|---|
| Reflux ratio | 20:1 |
| Head press., mm. Hg | 71 |
| Pressure drop, mm. Hg | 37 |
| Head temp., °C. | 187 |
| Feed plate temp., °C. | 213.5 |
| Reboiler temp., °C. | 220–220.5 |
| Residence time, min. | 15 |
| Amount of O/H, percent of feed | 3.74 |

3.74% of the feed was removed as overhead and had the following composition: 83.70% ortho toluenediamine; 9.30% meta toluenediamine and 6.97 Lites. The product removed as bottoms contained 98.58% meta toluenediamine; 1.16% High Boiler and 0.26% as Lites.

Although certain preferred embodiments of the invention have been illustrated in the above examples, it will be obvious to those skilled in this art that various modifications can be made therein without departing from the scope and spirit of our invention.

We claim:

1. A method for removing ortho toluenediamines present in minor amounts from toluenediamine mixtures containing predominantly meta toluenediamines which comprises introducing said toluenediamine mixtures into a column still having at least 23 theoretical plates, maintaining the column under subatmospheric pressure below about 120 mm. Hg absolute at the top of the column, removing vapor as distillate containing predominantly ortho toluenediamine from the top of the column, cooling and condensing said vapor, returning a portion of said condensate to the top of the column to maintain a reflux ratio of at least 15 to 1, collecting the remaining portion of the condensate containing predominantly ortho toluenediamine and constituting a minor amount of the feed, heating the unvaporized feed passing down through the bottom of the column to effect stripping of the more volatile constituents contained therein and recovering as bottoms product a mixture of meta toluenediamine containing less than 0.5% by weight of ortho toluenediamines.

2. A method for removing ortho toluenediamines present in an amount of 1–5% in toluenediamine mixtures constituting essentially meta toluenediamines which comprises introducing said toluenediamine mixtures into a column still having about 29–50 theoretical plates, introducing said toluenediamine feed at an intermediate point in the lower half of the column, maintaining the column under subatmospheric pressure within the range of about 10–70 mm. Hg absolute at the top of the column, removing vapor as distillate containing more than 80% by weight ortho toluenediamine from the top of the column, cooling and condensing said vapor, returning a portion of said condensate to the top of the column to maintain a reflux ratio between about 25 and 40 to 1 collecting the remaining portion of the condensate containing more than 80% by weight ortho toluenediamine and constituting 2–8% by weight of the feed, heating the unvaporized feed passing down through the bottom of the column to effect stripping of the more volatile constituents contained therein and recovering as bottoms product a mixture of meta toluenediamine containing less than 0.5% by weight of ortho toluenediamines.

3. A method for removing ortho toluenediamines present in an amount of 1–5% in toluenediamine mixtures constituting essentially meta toluenediamines which comprises introducing said toluenediamine mixtures into a column still having about 29–50 theoretical plates, introducing said toluenediamine feed preheated to a temperature of about 100–200° C. at an intermediate point in the lower half of the column, maintaining the column under subatmospheric pressure within the range of about 10–70 mm. Hg absolute and a temperature of about 150–180° C. at the top of the column, removing vapor as distillate containing more than 80% by weight ortho toluenediamine from the top of the column, cooling and condensing said vapor, returning a portion of said condensate to the top of the column to maintain a reflux ratio between about 25 and 40 to 1, collecting the remaining portion of the condensate containing more than 80% by weight ortho toluenediamine and constituting 2–8% by weight of the feed, heating the unvaporized feed passing down through the bottom of the column to effect stripping of the more volatile constituents contained therein, maintaining the temperature of the unvaporized feed below 230° C. and for a residence time of less than 30 minutes, and recovering as bottoms product a mixture of meta toluenediamine containing less than 0.5% by weight of ortho toluenediamines.

References Cited

UNITED STATES PATENTS

| | | | |
|---|---|---|---|
| 1,918,997 | 7/1933 | Weiland | 260—582 |
| 3,128,310 | 4/1964 | Koch | 260—582 |
| 3,270,058 | 8/1966 | Sutcliffe | 260—582 |

OTHER REFERENCES

Technique of Organic Chemistry: Distillation—Weissberger, pp. 27, 28, 58 and 59. Sec. edit. New York, N.Y. 1965.

WILBUR L. BASCOMB, JR., *Primary Examiner*.

U.S. Cl. X.R.

203—99, 98; 260—582